United States Patent
Rudy

(10) Patent No.: US 7,891,876 B2
(45) Date of Patent: Feb. 22, 2011

(54) LINEAR ROLLER BEARING

(75) Inventor: Dietmar Rudy, Kleinbundenbach (DE)

(73) Assignee: Schaeffler KG, Herzogenaurach (DE)

( * ) Notice: Subject to any disclaimer, the term of this patent is extended or adjusted under 35 U.S.C. 154(b) by 413 days.

(21) Appl. No.: 12/093,806

(22) PCT Filed: Nov. 7, 2005

(86) PCT No.: PCT/EP2006/068161

§ 371 (c)(1),
(2), (4) Date: Jun. 26, 2008

(87) PCT Pub. No.: WO2007/057319

PCT Pub. Date: May 24, 2007

(65) Prior Publication Data

US 2009/0214143 A1 Aug. 27, 2009

(30) Foreign Application Priority Data

Nov. 15, 2005 (DE) ......................... 10 2005 054 371

(51) Int. Cl.
*F16C 29/06* (2006.01)

(52) U.S. Cl. ...................................... 384/45

(58) Field of Classification Search ............. 384/43–45
See application file for complete search history.

(56) References Cited

U.S. PATENT DOCUMENTS

| | | | |
|---|---|---|---|
| 5,076,713 A | 12/1991 | Morita | |
| 5,397,839 A | 3/1995 | Patel | |
| 5,433,527 A | 7/1995 | Shimo et al. | |
| 2002/0067869 A1* | 6/2002 | Michioka et al. | 384/45 |
| 2002/0090152 A1* | 7/2002 | Shirai et al. | 384/45 |
| 2003/0053724 A1* | 3/2003 | Matsui et al. | 384/45 |
| 2003/0128901 A1* | 7/2003 | Yabe et al. | 384/45 |
| 2005/0018934 A1* | 1/2005 | Lee et al. | 384/45 |

FOREIGN PATENT DOCUMENTS

| | | |
|---|---|---|
| DE | 199 41 926 Y | 3/2000 |
| DE | 199 13 481.2 Y | 9/2000 |
| EP | 0 133 357 A | 2/1985 |
| EP | 0 875 684 Y | 11/1998 |
| EP | 1 323 750 Y | 7/2003 |

* cited by examiner

Primary Examiner—Thomas R Hannon
(74) Attorney, Agent, or Firm—Lucas & Mercanti, LLP

(57) ABSTRACT

Linear rolling bearing, having a guide carriage (1) which can be provided so as to be longitudinally movable on a guide rail (2) and in which rolling bodies (4) circulate in an endless rolling body channel (3) which has a load section (5) and a return section (6) and deflecting sections (7) which connect the load section (5) to the return section (6) in an endless fashion and which are in each case provided on a head piece (10) of the guide carriage (1) and have in each case one outer deflection (12) for the deflection of the rolling bodies (4), with the outer deflection (12) being formed from a plastic whose flexibility is specified by a quotient determined from the ratio of fracture strain to fracture stress, which quotient is greater than 0.15 in magnitude, with the fracture strain being specified in percent and the fracture stress being specified in megapascals.

6 Claims, 1 Drawing Sheet

LINEAR ROLLER BEARING

FIELD OF THE INVENTION

Figure 1:
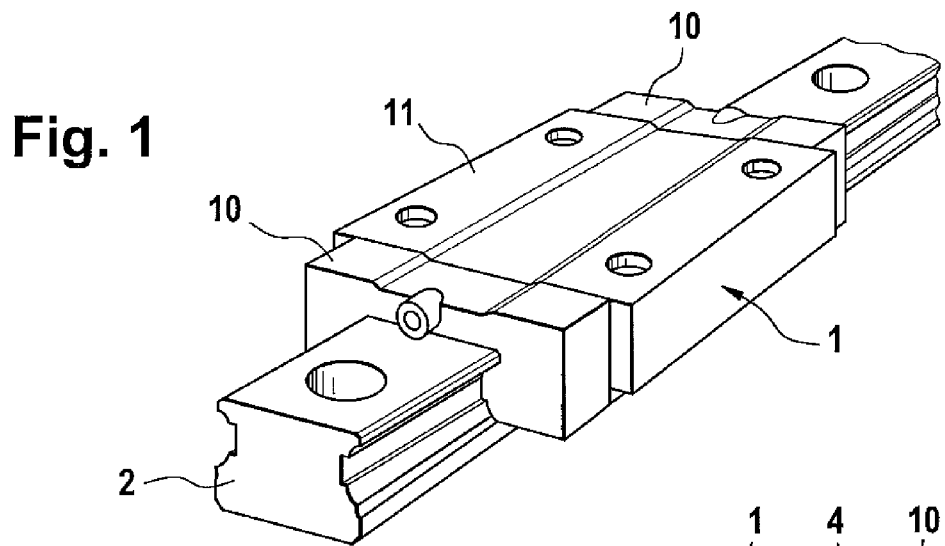

The present invention relates to a linear rolling bearing whose guide carriage can be arranged in a longitudinally movable manner on a guide rail.

EP 0 875 684 A2, for example, has disclosed a linear rolling bearing in which a guide carriage is arranged in a longitudinally movable manner on a guide rail. Endless rolling body channels, in which rolling bodies can circulate in an endless fashion, are provided in the guide carriage. The endless rolling body channel has a load section, a return section and two deflecting sections which connect the load section to the return section in an endless fashion. An unlimited movement of the guide carriage along the guide rail is possible in this way. Several parts of the guide carriage are produced from plastic, with which a so-called "corner crack" is prevented and which has a long service life. Said document proposes, as a preferred plastic, for example a fiber-reinforced polybutylene terephthalate (PBT), which meets said requirements.

Also known are linear rolling bearings in which parts of the guide carriage are produced from fiber-reinforced polyamide.

In particular the deflecting sections of the endless rolling body channel are conventionally produced from highly wear-resistant and low-expansion plastic materials. In the case of high traveling speeds of the guide carriage (>6 m/sec), the rolling bodies, which are conventionally formed from steel, exert considerable centrifugal forces in particular on the outer deflection in the deflecting sections. Under the centrifugal forces which act, instances of impact contact of the rolling bodies against the deflecting section occur. Said instances of impact contact increase undesired wear in the deflecting sections. The centrifugal forces can be reduced in that the rolling bodies are produced not from steel but rather from ceramic material. On account of the low specific weight of ceramic, the ceramic rolling bodies exert considerably reduced centrifugal forces on the outer deflection. A disadvantage of said linear rolling bearings is that hybrid guides of said type are very expensive.

It is an object of the present invention to specify a linear rolling bearing as per the features of the preamble of claim 1 which is suitable in particular for high traveling speeds of the guide carriage.

According to the invention, said object is achieved in that the outer deflection is formed from a plastic whose flexibility is specified by a quotient determined from the ratio of fracture strain to fracture stress, which quotient is greater than 0.15 in magnitude, with the fracture strain being specified in percent and the fracture stress being specified in megapascals: the values for fracture strain and fracture stress relate to manufacturer specifications which usually conform to the ISO 527-1/-2 standard.

In contrast to the established practice of using hard and wear-resistant plastic in particular for the deflecting region, the invention follows an entirely different path. The plastic proposed according to the invention is considerably softer or more flexible than the plastics previously used for this application. The invention proposes a new approach in the selection of plastics in particular for the production of the deflecting sections.

Running tests under high-speed conditions have shown that materials of said type dampen impacts of the impacting rolling bodies in particular in the deflecting region on account of the comparatively rubber-like material properties, without said damping being associated with appreciable wear. Despite a possibly reduced tensile strength of the softer material, it has been found that the wear is considerably reduced in particular in the deflection in relation to known guide carriages. The service life of linear rolling bearings according to the invention is increased considerably in relation to known linear rolling bearings for high-speed applications.

While the above-specified flexibility value of 0.15 defines a lower limit for the flexibility, an upper limit of the flexibility is defined in that no plastic deformations in particular of the outer deflection occur on account of the acting centrifugal forces.

Good results were obtained with the thermoplastic polyester Hytrel 5555HS from DuPont. Said plastic is specified by the manufacturer as having a fracture stress of approximately 42 MPa and a fracture strain of approximately 520%. This gives a quotient of approximately 12.3. In the case of this material which is particularly suitable according to the invention, it is clear that the fracture strain is very much higher than known plastics provided for the production of deflecting sections. For example, in the case of fiber-reinforced PBT, the fracture strain is approximately 3%.

Good test results were obtained with plastics whose fracture stress is <60 MPa. Good results were likewise observed with plastics whose fracture strain is >10%, preferably >100%. In particular plastics whose fracture stress is <60 MPa and whose fracture strain is >100% exhibit excellent properties of absorbing the centrifugal forces of the rolling bodies in the deflecting region without appreciable wear occurring on the deflecting paths of the deflecting sections.

In a known way, the head piece can be integrally formed with the outer deflection of the deflecting section. The head piece with the integrally formed outer deflection can then be formed in a favorable manner from the plastic proposed according to the invention.

Like the outer deflection, the inner deflection of the deflecting section can also be formed from said plastic.

For the return channel, it is possible to use a different plastic, for example a fiber-reinforced polyamide material whose flexibility can also be <0.15.

Figure 2:
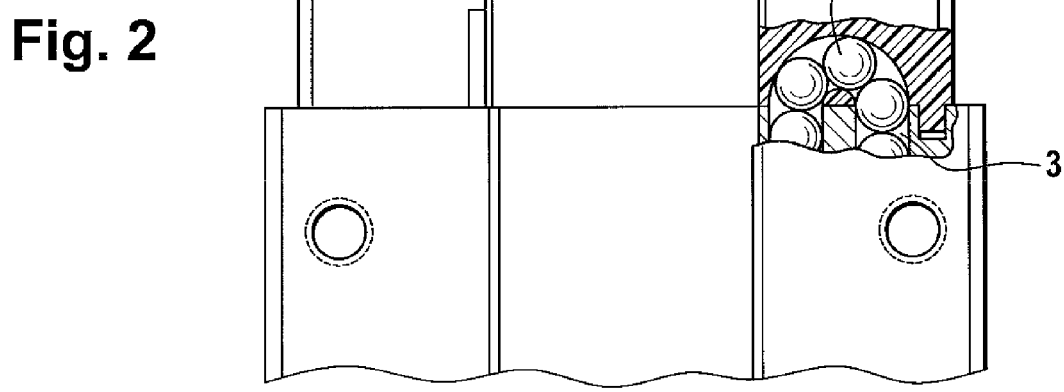
Figure 3:
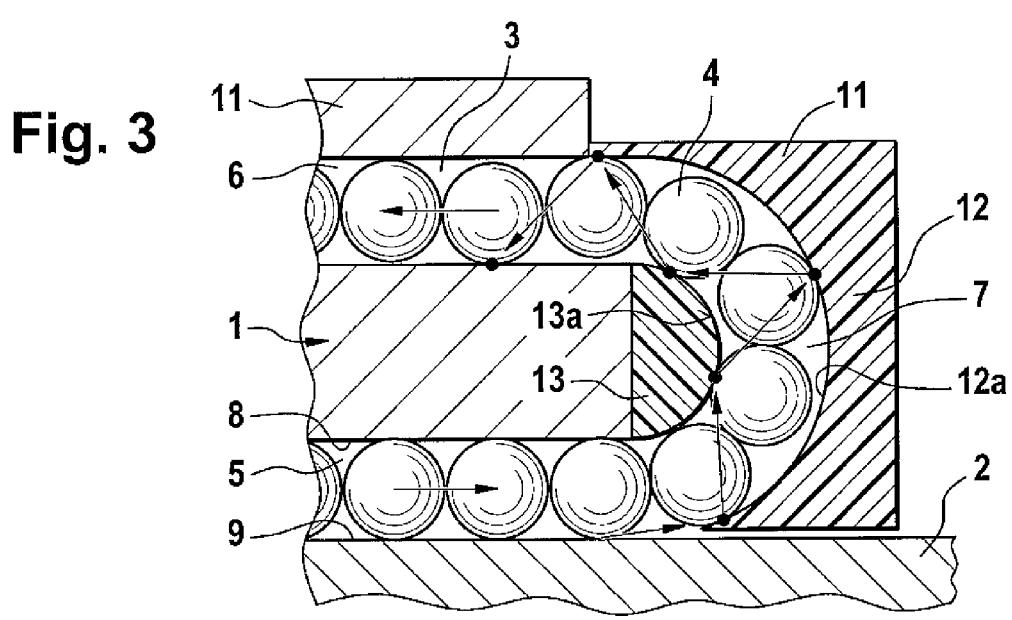

The invention is explained in more detail below on the basis of an exemplary embodiment which is depicted in three figures, in which:

FIG. 1 shows a linear rolling bearing according to the invention in a perspective illustration, FIG. 2 shows an enlarged detail of said linear rolling bearing according to the invention, partially in section and FIG. 3 shows, in a schematic illustration, a longitudinal section through the linear rolling bearing according to the invention.

DETAILED DESCRIPTION OF THE DRAWINGS

In the linear rolling bearing according to the invention depicted in FIGS. 1 to 3, a guide carriage 1 is arranged in a longitudinally movable manner on a guide rail 2. The guide carriage 1 is provided with an endless rolling body channel 3 in which balls which are provided as rolling bodies 4 circulate in an endless fashion. The rolling body channel 3 has a load section 5 and a return section 6 and two deflecting sections 7 which connect the load section 5 to the return section 6 in an endless fashion.

In the load section 5, the rolling bodies 4 roll on raceways 8, 9 of the guide carriage 1 and of the guide fail 2.

The deflecting section 7 is formed in the region of a head piece 10 which is arranged at the end side on a support body 11 of the guide carriage 1. The head piece 10 is formed from plastic.

The deflecting section 7 comprises an outer deflection 12 and an inner deflection 13. The outer deflection 12 is produced in one piece with the head piece 10. The inner deflection 13 is formed by a separate plastic part which is likewise held at the end side on the support body 11 of the guide carriage 1. The rolling bodies 4 are deflected between the outer deflection 12 and the inner deflection 13 on an outer deflecting path 12a of the outer deflection 12 and on an inner deflecting path 13a of the inner deflection 13.

Considerable instances of impact contact of the rolling bodies 4 against the delimitations of the endless rolling body channels 3 can occur in particular at high traveling speeds of the guide carriage 1. Instances of impact contact are illustrated in FIG. 3 by black dots. Numerous pronounced instances of impact contact occur in the deflecting section 7 in particular on account of considerable centrifugal forces of the fast-circulating rolling bodies 4.

The head piece 10 with the integrally formed outer deflection 12 and the inner deflection 13 are produced from the plastic Hytrel 5555HS. Said plastic has, according to the specifications of the manufacturer DuPont, a fracture strain of approximately 520% and a fracture stress of approximately 42 MPa. Said plastic has a good degree of flexibility which is defined by the ratio of fracture strain to fracture stress, with the quotient formed from this assuming approximately the value 12.3 in magnitude. The fracture stress is for this purpose specified in percent and the fracture strain in megapascals.

On account of the high centrifugal forces, the rolling bodies 4 impact with a large impact force against the inner deflection 13 and the outer deflection 12. With the plastic proposed according to the invention, said impacts are excellently damped without appreciable wear occurring on the head piece 10 or on the inner deflection 13. The high fracture strain provides the material with a capability, referred to here as flexibility, of damping said impact forces.

LIST OF REFERENCE SYMBOLS

1 Guide carriage
2 Guide rail
3 Endless rolling body channel
4 Rolling bodies
5 Load section
6 Return section
7 Deflecting section
8 Raceway
9 Raceway
10 Head piece
11 Support body
12 Outer deflection
12a Outer deflecting path
13 Inner deflection
13a Inner deflecting path

The invention claimed is:

1. Linear rolling bearing, comprising a guide carriage which can be provided so as to be longitudinally movable on a guide rail and in which rolling bodies circulate in an endless rolling body channel which has a load section and a return section and deflecting sections which connect the load section to the return section in an endless fashion and which are in each case provided on a head piece of the guide carriage and have in each case one outer deflection for the deflection of the rolling bodies, wherein the outer deflection is formed from a plastic whose flexibility is specified by a quotient determined from the ratio of fracture strain to fracture stress, which quotient is greater than 0.15 in magnitude, with the fracture strain being specified in percent and the fracture stress being specified in megapascals.

2. Linear rolling bearing according to claim 1, wherein the flexibility is greater than 10 in magnitude.

3. Linear rolling bearing according to claim 1, wherein the fracture stress of the plastic is less than 60 megapascals.

4. Linear rolling bearing according to claim 1, wherein the fracture strain of the plastic is greater than 10 percent.

5. Linear rolling bearing according to claim 1, wherein the head piece with the integrally formed outer deflection is formed from said plastic.

6. Linear rolling bearing according to claim 1, wherein the deflecting section comprises an inner deflection between which and the outer deflection the rolling bodies are arranged, with the inner deflection being formed from said plastic.

* * * * *